United States Patent [19]

Vollmann

[11] Patent Number: 5,610,778
[45] Date of Patent: Mar. 11, 1997

[54] MAGNETIC TAPE APPARATUS WHICH SENSES AND PLAYS DIFFERENT TYPES OF CASSETTE

[75] Inventor: Norbert C. Vollmann, Eindhoven, Netherlands

[73] Assignee: U.S. Philips Corporation, New York, N.Y.

[21] Appl. No.: 344,790

[22] Filed: Nov. 23, 1994

Related U.S. Application Data

[63] Continuation of Ser. No. 238,140, May 3, 1994, abandoned, which is a continuation of Ser. No. 59,720, May 10, 1993, abandoned, which is a division of Ser. No. 935,150, Aug. 24, 1992, Pat. No. 5,237,479, which is a continuation of Ser. No. 879,705, May 5, 1992, abandoned, which is a continuation of Ser. No. 547,741, Jul. 3, 1990, abandoned.

[30] Foreign Application Priority Data

Jul. 3, 1989 [NL] Netherlands ............................ 8901682
Feb. 14, 1990 [NL] Netherlands ............................ 9000348

[51] Int. Cl.⁶ ................................................ G11B 15/675
[52] U.S. Cl. .......................................................... 360/94
[58] Field of Search ............................ 360/94, 96.5, 96.6

[56] References Cited

U.S. PATENT DOCUMENTS 5,172,284  12/1992  Ohshima ................................... 360/94

*Primary Examiner*—Robert S. Tupper
*Attorney, Agent, or Firm*—Brian J. Wieghaus

[57] ABSTRACT

A magnetic tape apparatus having a magnetic head, reel drive spindles for driving the reels of a magnetic tape cassette and a pressure roller-capstan combination for driving the tape within the cassette. The apparatus includes an actuating member with urging projections for sliding a slidable cover on a magnetic tape cassette of a first type, having a first thickness between its main walls, when the cassette is inserted into the apparatus. A sensor on the actuating means senses the insertion of a cassette of a second type, having a thickness between its main walls greater than the thickness of the first type of cassette, for moving the actuating member to a position which permits the second type of cassette to be fully inserted in the apparatus and cooperate with the reel drive spindles, the pressure-roller-capstan arrangement and the magnetic head.

9 Claims, 8 Drawing Sheets

MAGNETIC TAPE APPARATUS WHICH SENSES AND PLAYS DIFFERENT TYPES OF CASSETTE

This is a continuation of application Ser. No. 08/238,140, filed on May 3, 1994 (now abandoned), which is a continuation of Ser. No. 08/059,720, filed on May 10, 1993 (now abandoned), which is a divisional of Ser. No. 07/935,150, filed Aug. 24, 1992, now U.S. Pat. No. 5,237,479, issued on Aug. 17, 1993, which is a continuation of Ser. No. 07/879,705, filed on May 5, 1992 (now abandoned), which is a continuation of Ser. No. 07/547,741, filed on July 3, 1990 (now abandoned).

BACKGROUND OF THE INVENTION

The invention relates to a magnetic tape cassette provided with magnetic tape on two coplanar reels in a housing having two plane parallel main walls interconnected by transverse walls, of which one transverse wall constitutes a cassette front wall having a central opening, and a shutter which is movable between a closed position and an open position to cover the central opening in the closed position and to expose said opening in the open position.

In recent new systems employing magnetic-tape cassettes for recording video signals or digital audio signals the high information density on the magnetic tape leads to high susceptibility to the effects of dirt and dust. To protect the magnetic tape the cassettes are therefore provided with a shutter which can close the openings in the cassette when the cassette has been removed from the apparatus.

A magnetic tape of the type defined in the opening sentence is known in the form of a VHS tape. An apparatus for playing the known tape is disclosed in DE 34 14 598 A1 and the known cassette is disclosed in DE 30 45 438 A1. This known cassette comprises a shutter which is pivotable about an axis parallel to the front wall of the cassette and which in its open position overlies the main wall of the cassette. This means that space must be available in the apparatus above the cassette to accommodate the shutter.

A new magnetic tape cassette system having apparatus for playing new cassettes having a shutter as well as existing compact cassettes without shutters will be introduced. It would be advantageous if the new cassettes with a shutter were designed so that they were to a large degree mechanically interchangeable with the existing compact cassettes so that existing apparatus have to be modified only to a minimal extent. An additional advantage will then be that the manufacturers of the existing apparatus can manufacture the new apparatus without drastically modifying the production process.

However, if the shutter is of a construction similar to that of the above-mentioned prior-art cassette disclosed in DE 30 45 438 A1 this means that in the apparatus space should be provided which is not available in the existing apparatus of the Compact Cassette system. This requires drastic modifications in the apparatus, so that the manufacturers should invest additionally in the production of the apparatus.

SUMMARY OF THE INVENTION

It is an object of the invention to provide a cassette with a shutter which in its open position does not occupy more space than required by the cassette with the shutter in its closed position or without a shutter.

To this end, a cassette in accordance with the invention is characterized in that the shutter is slidable along the cassette front wall in a lateral direction and has a shutter front wall situated near the cassette front wall and extending parallel thereto. The shutter front wall is formed with a front shutter opening such that in the closed shutter position the front shutter opening is situated directly adjacent the central opening in the front wall of the housing. In the open position of the shutter, the shutter front opening faces an imperforate portion of the cassette front wall and the central opening in the front wall of the housing is covered by an imperforate portion of the shutter front wall. The shutter also includes main portions adjoining the shutter front wall and overlying the main walls of the cassette. Since the shutter is slidable over the cassette between an open position and a closed position and the open position is not reached by pivoting of the shutter away from the cassette, the cassette including the shutter does not occupy any additional space in the open position. As a result of this, the existing loading/unloading and tape drive mechanisms of the magnetic tape apparatus in conformity with the Compact Cassette system can be used for the new system without any drastic modifications.

A further advantage is that when the cassette is opened the cassette with the shutter does not occupy any additional space in the apparatus. As a result of this, the cassette may be opened while inside the apparatus without any additional space being required in the apparatus for the shutter movement.

An embodiment of a system in which a pressure roller opening for the passage of a pressure roller is situated at at least one side of the central opening in the front wall of the cassette characterized in that the shutter front wall has a central front wall, which faces the central opening of the cassette front wall in the closed position, and at least one lateral front wall which is spaced from said central front wall by said front opening in said shutter and which covers the pressure roller opening in the closed position, and in that in the open position of the shutter the central front wall and the lateral front wall face the imperforate portion of the cassette front wall directly adjacent the central opening and the pressure-roller opening. In this way it is possible that by a small displacement of the shutter over a distance equal to the length of only one of the openings in the front wall one shutter enables a plurality of spaced-apart openings in the front wall of the cassette housing to be covered or exposed.

A modification thereof even enables, in addition to the central opening and said pressure roller opening, a further pressure rolling opening to be closed by means of a single shutter. A further embodiment of the system, in which the at least one pressure roller opening extends into the main walls of the cassette for the passage of a pressure roller having a height larger than the local distance between the main walls is characterized in that the corresponding front opening of the shutter extends into the main portions and in the opened position of the shutter exposes the pressure roller opening both in the cassette front wall and in the main walls of the cassette. As a result of this, the part of the pressure roller opening in the main walls of the cassette can also be exposed. This enables the height of the pressure roller of a tape transport device to be larger than the thickness of the cassette, yet enabling the pressure roller to cooperate with the magnetic tape. Systems have been proposed for recording/reproducing signals, for example audio signals, which systems comprise both cassettes of an existing type and cassettes of a deviating new type, for which reference is made to U.S. patent application Ser. No. 532,469 filed May 31, 1990 (now abandoned) and U.S. patent application Ser.

No. 545,307 filed Jun. 26, 1990. The new system comprises apparatus on which cassettes of both types can be played. At the location of the front wall one type of cassette provides enough room for pressure roller of such a length that it cannot be accommodated in cassettes of the other type. By the use of the last mentioned embodiment of the invention problems can be avoided. In yet another embodiment, the cassette has two drive apertures in a main wall in the centers of the reels for the passage of two reel drive spindles of an apparatus. A main portion of the shutter comprises cover portions which cover the two drive apertures in its closed position. That said main portion of the shutter is formed with at least one recess which in the open position of the shutter faces a drive aperture; the other drive aperture being situated besides the shutter so that both drive apertures are exposed. The shutter in the known cassette is only capable of covering openings in the front wall of the cassettes. Since in the cassette of the system in accordance with the invention the main portions of the shutter comprise cover portions is also possible to cover openings in the main walls of the cassette. In the closed position, the shutter according to this embodiment precludes the ingress of dust or dirt into the cassette via the drive apertures, and the reel hubs are protected against damage.

For a reversible magnetic tape cassette, drive apertures have to be provided in both main walls and both main portions of the shutter should comprise cover portions to enable the openings to be covered in the closed position.

For a non-reversible cassette, the other main wall is substantially imperforate and the main portion of the shutter which overlies the substantially imperforate wall extends over, at the most, half the distance between the cassette front wall and the center of the reels. Since one main wall of the cassette is substantially imperforate the corresponding main portion of the shutter can be smaller. This has the advantage that a larger surface area of the cassette can be used for applying a label.

In still another embodiment, a main wall of the cassette has locating apertures for the passage of locating pins of an apparatus, which pins are engageable in the locating apertures and each have a supporting surface adapted to cooperate with the main wall of the housing directly around the locating apertures. A main portion of the shutter comprises passages having an area larger than that of the supporting surfaces of the locating pins, in that in the opened position the passages overlie the locating apertures and expose a part of the main wall of the cassette around said apertures to allow an unobstructed cooperation of the main wall with the locating pins, and in that in the closed position of the shutter the passages overlie an imperforate part of the main wall. Locating apertures in cassettes are generally known for example from Compact Cassettes as defined in IEC publication 94. A very important feature of the construction of the shutter in accordance with the invention is that the type being present of the cover portions of the shutter which overlie the main walls the supporting surfaces of the locating pins can cooperate unimpedably with the portions of the main walls of the cassette which are situated around the locating apertures in the opened position of the shutter. This is very important in order to prevent the presence of the shutter from influencing the height position of the cassette in an apparatus. If the supporting surfaces cooperate with the shutter, height variations may arrive as a result of variations in the thickness of the shutter and the clearance between the shutter and the main wall of the cassette. Another very important feature is that if the shutter is to be opened by means of a construction provided in the apparatus, the cassette in accordance with the invention cannot be loaded into an apparatus which is not constructed for cooperation with the cassette. In such non-compatible apparatus the shutter covers the locating apertures so that the locating pins in the apparatus cannot engage the locating apertures. Thus, the cassette is held back and cannot be loaded into the apparatus. For systems comprising reversible cassettes it is again necessary to form locating apertures in both main walls and both main portions of the shutter should be formed with passages.

A suitable embodiment of the cassette in accordance with the invention is characterized in that only the main portions of the shutter situated at the main housing wall having the drive apertures are formed with passages for locating pins.

In yet another embodiment, the shutter is movable along the cassette front wall from the closed position in opposite directions and has two opened positions which are disposed symmetrically at opposite sides of the closed position. Since a reversible cassette is to be loaded into an apparatus in two ways and the apparatus generally comprises means for moving the shutter in one specific direction the shutter must be movable into opposite directions.

For the correct guidance of the shutter over the housing of the cassette and embodiment of the system is characterized in that a main-wall of the cassette has a guide way for guiding the shutter and in that the shutter comprises guide portions which extend transversely of a main portion and which engage the guide way. This also prevents the shutter from becoming detached from the cassette housing. In order to prevent the shutter from being inadvertently set to the open position, which could give rise to damaging or soiling of the magnetic tape, a further embodiment is characterized in that the shutter of the cassette has a stable closed position, and in that the cassette comprises urging means which urge the shutter from an open position to the closed position. Preferably, the urging means may comprise resilient means which are tensioned in the open position and which subject the shutter to a force directed towards the closed position.

In still a further embodiment, the main and front walls of the cassette housing are locally recessed over a distance to a depth at least substantially equal to the thickness of the shutter, in such a way that the non-recessed portions of said walls and the outer surface of the shutter are substantially flush with each other. This substantially prevents the shutter from being inadvertently urged into the opened position by projecting portions of the shutter, for example if the shutter is situated on the main walls of the cassette housing instead of in the recesses.

It is undesirable that a user of the system has to set the shutter to the open position before the cassette is inserted into the apparatus. In order to avoid this, a lateral edge of the shutter has a recess in a main wall for receiving an urging means of a magnetic tape apparatus which is in contact with the lateral edge of the shutter and exerts a lateral force in the shutter to move it to its open position. In order to prevent the shutter from being pulled out of square when the cassette is opened an embodiment of the system is characterized in that the apparatus comprises urging means for the simultaneous cooperation with the lateral edges of the main portions of the shutter at both main walls of the cassette. For a correct positioning of the urging means relative to the shutter a further embodiment of the system is characterized in that the urging means comprise an at least substantially fork-shaped free end portion which engages around the cassette front wall and which comprises urging projections for cooperation with the shutter.

Yet another embodiment of the system is characterized in that the urging means are pivotable about a pivotal axis and are also translatable in a direction towards the pivotal axis. During insertion of the cassette into the apparatus the cassette acts against the urging means which are thereby pivoted and in their turn act against the shutter. In order to eliminate lost motion between the shutter and the housing of the cassette in the open position of the shutter and in order to keep the shutter correctly in its open position the urging means are translatable in a direction towards the pivotal axis against the action of a spring.

For a better engagement with the portion of the urging means which makes contact with the lateral edge of the shutter a further embodiment of the system is characterized in that at its side which is remote from the shutter the recess has a bevelled edge which is inclined relative to the cassette front wall.

A further embodiment of the system in accordance with the invention is characterized in that the apparatus are also adapted to cooperate with the cassettes of a second type not having a shutter and having a cassette front wall of a larger height, and in that the apparatus comprise actuating means for opening the shutter of a cassette, which actuating means comprise sensing means which sense the height of the cassette front wall to bring the actuating means in a position in which the cassette and the apparatus can cooperate freely with each other. This enables apparatus of a new system in accordance with the invention to cooperate with existing cassettes of, for example, the Compact Cassette system. As a result of this the consumer requires only one apparatus which can cooperate with the existing and with the new cassette, so that the existing cassettes are not rendered useless.

BRIEF DESCRIPTION OF THE DRAWINGS

Some embodiments of the invention will now be described in more detail, by way of example, with reference to the drawings in which.

DESCRIPTION OF THE PREFERRED EMBODIMENTS

Figure 1:
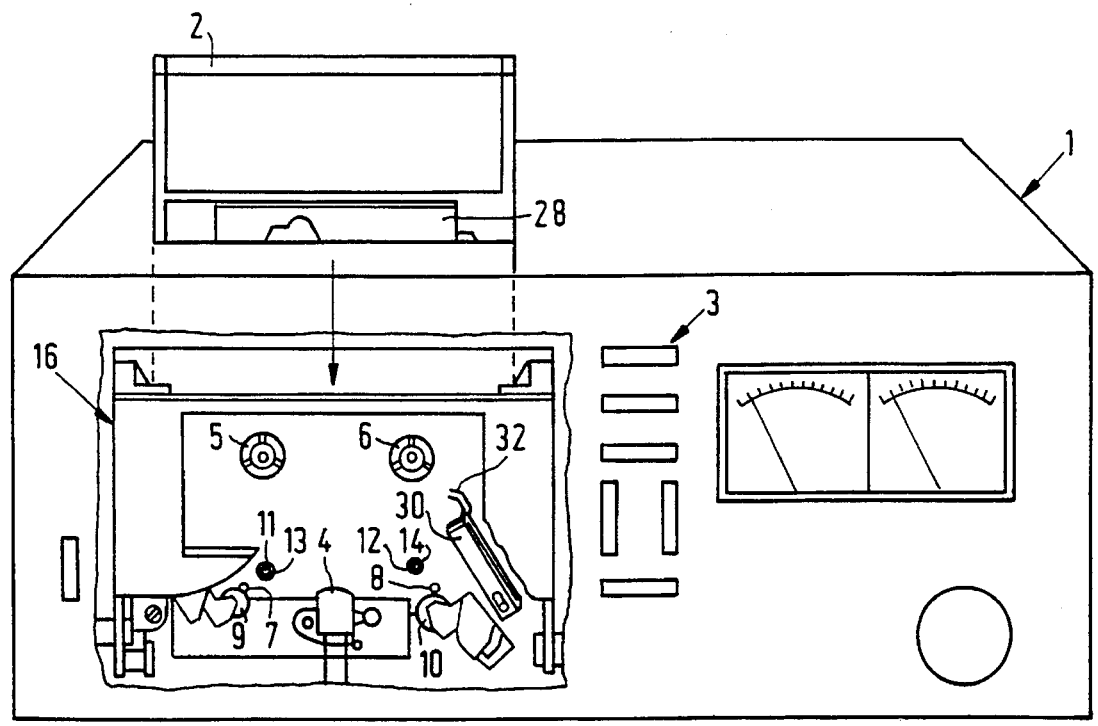
FIG. 1 shows an apparatus in accordance with the invention with a cassette in accordance with the invention.

FIG. 1 shows an apparatus 1 and a cassette 2 of a new system in accordance with the invention for recording and reproducing audio signal on/from magnetic tape. The apparatus comprises control means 3 for controlling various functions of the apparatus and magnetic-head means comprising a magnetic head 4 for reading and writing information on/from the magnetic tape in the cassette. The magnetic tape is wound on reels. The apparatus further comprises tape transport means comprising capstans 7, 8 and pressure rollers 9, 10 for the transport of the magnetic tape past the magnetic-head means 4. During tape transport the magnetic tape is unwound from one of the reels and is taken up on the other reel by means of reel drive spindles 5, 6. The apparatus comprises locating pins 11, 12 having supporting surfaces 13, 14 for positioning the cassette. The apparatus comprises a loading mechanism 16 in the form of a cassette holder which is pivotable to receive the cassette. The parts described above and their operation are generally known from apparatuses adapted to cooperate with cassettes in conformity with the well-known Compact Cassette system.

Figure 2:
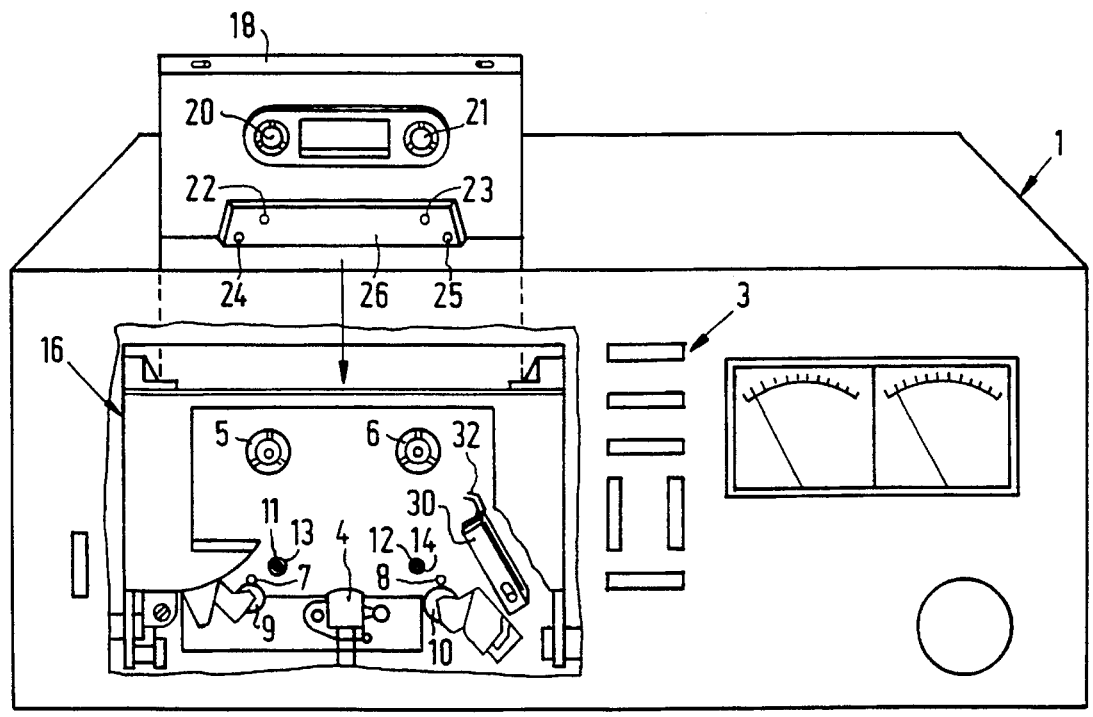
FIG. 2 shows an apparatus in accordance with the invention with an existing cassette in conformity with the Compact Cassette system.

The apparatus i is also constructed to cooperate with the well known Compact Cassettes. FIG. 2 shows such a cassette 18. The Compact Cassette 18 has drive apertures 20, 21, locating apertures 22, 23 and openings 24, 25 for the passage of the capstans 7 and 8. For the passage of the pressure rollers 9, 10 and the magnetic head means 4 the cassette 18 has a thicker portion 26 which bounds openings in the front wall of the cassette.

The cassette 2 (FIG. 1) in accordance with the new system comprises a shutter 28 which in a closed position covers openings in the-cassette. To open the shutter 28 the loading mechanism 16 of the apparatus 1 comprises urging means 30 which can exert lateral pressure on the shutter 28. These urging means 30 comprise sensing means 32, which during cooperation with the Compact Cassette 18 are in contact with the thicker portion 26, so that the urging means 30 are pushed away and remain inoperative.

Figure 3:
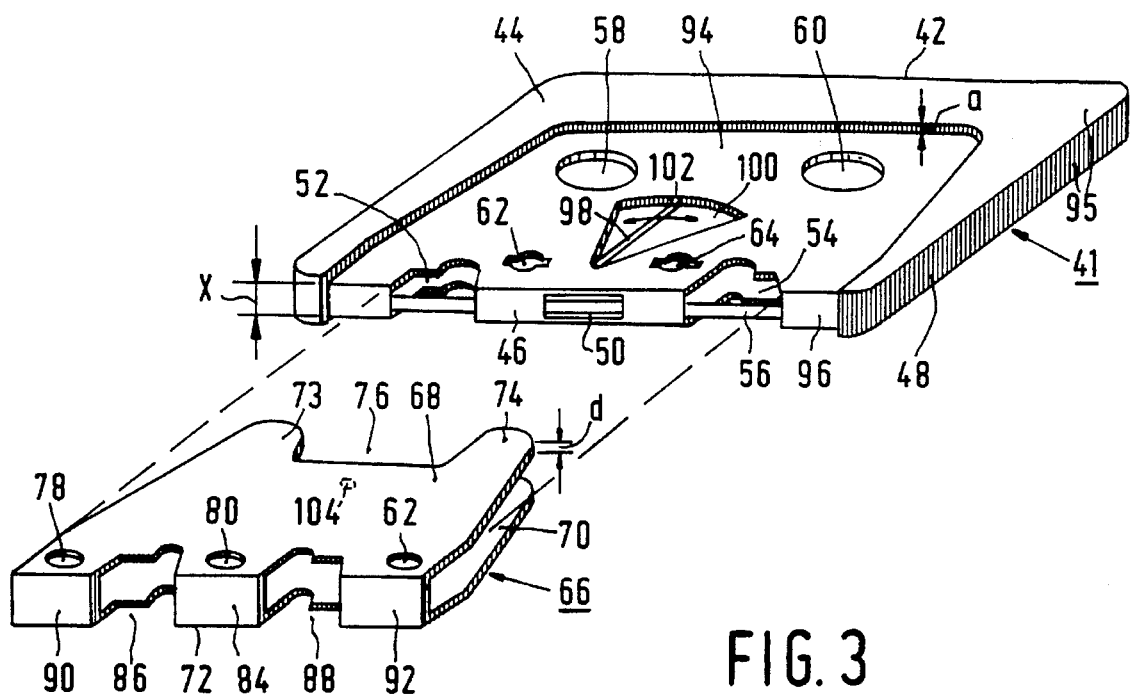
FIG. 3 is a perspective view of a first embodiment of a cassette in accordance with the invention with a detached shutter.

FIG. 3 shows a first embodiment of the cassette in accordance with the new system. The cassette 41 comprises a housing 42 having two plane-parallel main walls 44 interconnected by transverse walls 46, 48, of which one transverse wall constitutes a cassette front wall 46. The cassette front wall 46 is formed with a central opening 50 for the passage of the magnetic head 4, and two pressure-roller openings 52, 54, situated at opposite sides of the central opening, for the passage of the pressure rollers 9, 10. The pressure roller openings 52, 54 extend into the main walls 44 and have such a shape that the capstans 7, 8 can enter the cassette through the pressure roller openings. This shape of the pressure roller openings 52, 54 has the advantage that pressure rollers 9, 10, having a height larger than the local distance x between the main walls of the cassette 41, can also cooperate with a magnetic tape 56 in the cassette. The main walls 44 further have drive apertures 58, 60 for the passage of reel drive spindles 5, 6 and coaxial locating apertures 62, 64 for the passage of locating pins 11, 12.

In order to protect the magnetic tape 56 in the cassette 41 against damage and to preclude the ingress of dust and dirt into the cassette, the cassette comprises a shutter 66 to close the above-mentioned openings. The shutter 66 comprises two main portions 68, 70 overlying the main walls 4 of the cassette and a shutter front wall 72 overlying the cassette front wall 46, at least when the shutter 66 is placed on the cassette 41. The main portions 68, 70 of the shutter 66 comprise cover portions 73, 74 for covering the drive apertures 58, 60, and between the cover portions a recess 76 is formed. The main portions 68, 70 are formed with passages 78, 80, 82 for the passage of the locating pins 11 and 12, at least in an open position of the shutter 66. The shutter front wall 72 has a central front wall 84 and two lateral front walls 90, 92 which are spaced from said central front wall by two identical front openings 86, 88 and which serve for covering the openings 50, 52 and 54 in the front wall 46 of the cassette 41. The other main wall of the cassette, which is not visible in FIG. 3, is formed with further drive apertures and further locating apertures.

The cassette shown herein exhibits the principal characteristic features of the Compact Cassette in conformity with the international standard IEC 94-7. When the slide is open, the cassette can cooperate with an apparatus belonging to the Compact Cassette system, at least if a suitable height positioning of the front of the cassette is provided to ensure that the magnetic tape is situated at the appropriate height.

In order to obtain a flat and consequently convenient-to-handle cassette each main wall 44 is formed with a recess 94 in which the main portions 68, 70 of the shutter 66 engage. In order to obtain a flat cassette front wall 46 the cassette front wall 46 has a further recess 96 in which the shutter front wall 72 is engageable. The main walls 44 and the cassette front wall 46 are recessed over a distance a equal to the thickness of the shutter 66. As a result of this, the outer surface of the shutter 66 will be flush with the non-recessed portions 95 of the main walls 44 and of the cassette front wall 46. In order to keep the shutter 66 in its closed position, the cassette 41 comprises urging means. These urging means comprise a resilient pin 98 arranged in a further recess or opening 100 in the main wall 44. The pin 98 has a projecting portion 102 situated in a pothole 104 in the main wall 44 of the shutter.

Figure 4:
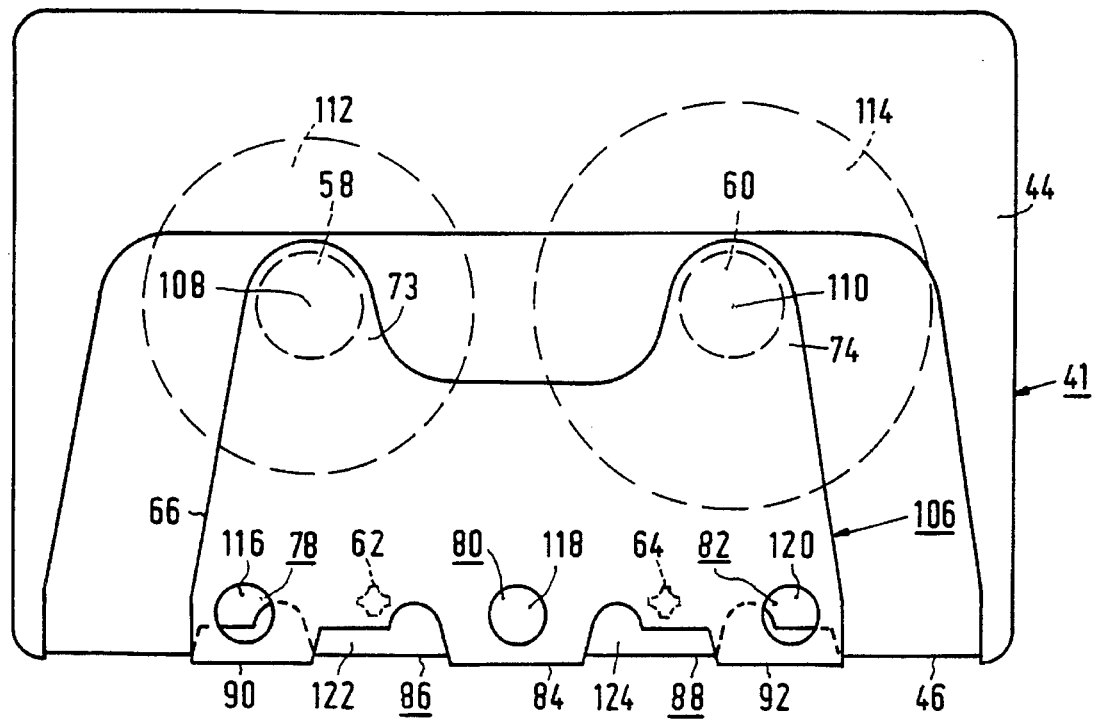
FIG. 4 is a plan view of the cassette shown in FIG. 3 with the shutter in the closed position.

FIG. 4 shows the shutter 66 in its closed position 106. The closed position 106 corresponds to a central position of the shutter 66 relative to the cassette 41. The cover portions 73, 74 cover the drive apertures 58, 60, which drive apertures are coaxial with the centers 108, 110 of reels 112, 114 on which the magnetic tape is wound. The passages 78, 80, 82 and the front openings 86, 88 face imperforate portions 116, 118, 120, 122 and 124 of the main wall 44 and of the cassette front wall 46. The central front wall 84 and the lateral front walls 90, 92 cover the central opening 50 and the pressure roller openings 52, 54.

Figure 5:
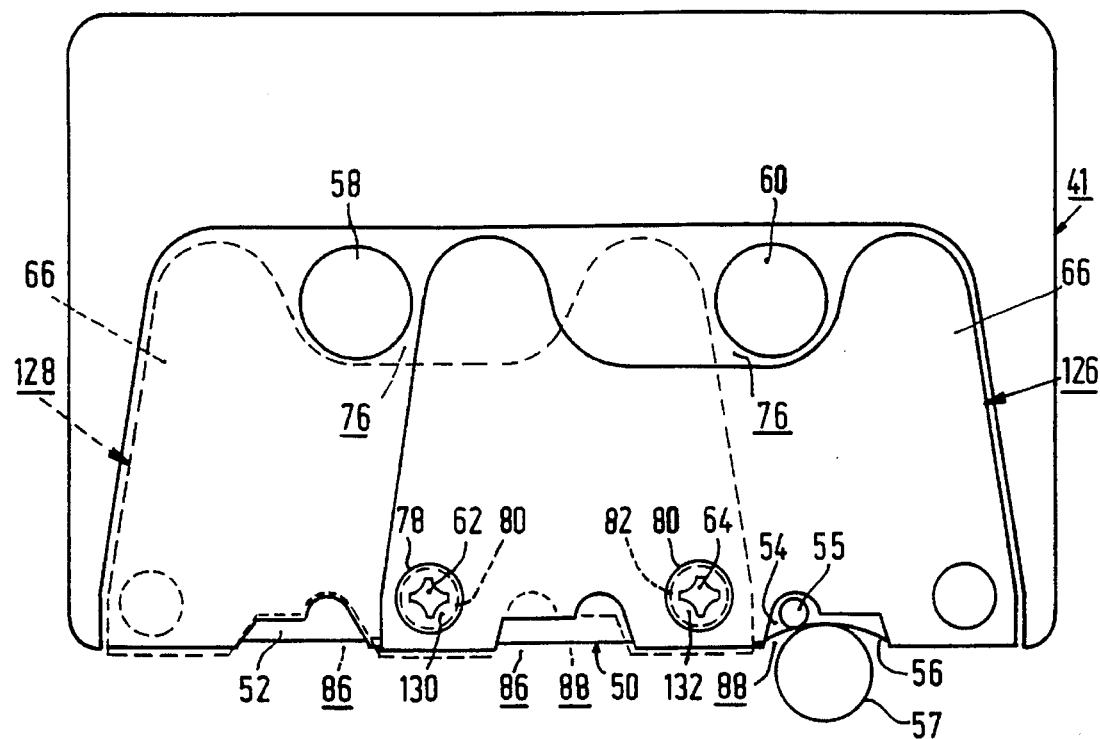
FIG. 5 is a plan view of the cassette shown in FIG. 3 with the shutter shown in an open position.

FIG. 5 shows the shutter 66 in a first open position 126 (solid lines) and in a second open position 128 (broken lines). In this first and second open position 126 and 128 respectively one drive aperture 60 or 58 is situated within the recess 76 and the other drive aperture 58 or 60 is situated beside the shutter 66. In the first open position 126 and the second open position 128 the passages 78, 80 and 80, 82 respectively are situated above the locating apertures 62 and 64 and the front openings 86 and 88 face the magnetic-head opening 50 and the pressure roller opening 54, or the pressure roller opening 52 and the magnetic head opening 50, and the other pressure roller opening 52 or 54 is situated beside the shutter 66. The two open positions 126 and 128 are situated symmetrically at opposite sides of the closed position 106 (FIG. 4) and are reached by sliding the shutter 66 from the closed position 106 to the open position 126 or 128.

If the shutter 66 is in one of the open positions 126 or 128 and is not held in the open position, the urging means, in the present case comprising the resilient pin 102, will urge the shutter 66 back to the closed position 106.

Portions 130, 132 of the main walls 4 directly around the locating apertures 62, 64 cooperate with supporting surfaces 13, 14 (FIG. 1) of the locating pins 11, 12 during cooperation with the apparatus 1. For an unimpeded cooperation between the supporting surfaces and the portions 130, 132 around the locating apertures 62, 64 the passages 78, 80 and 82 also allow the passage of the supporting surfaces. For this purpose the passages 78, 80 and 82 are larger in area than the supporting surfaces of the locating pins.

Figure 6:
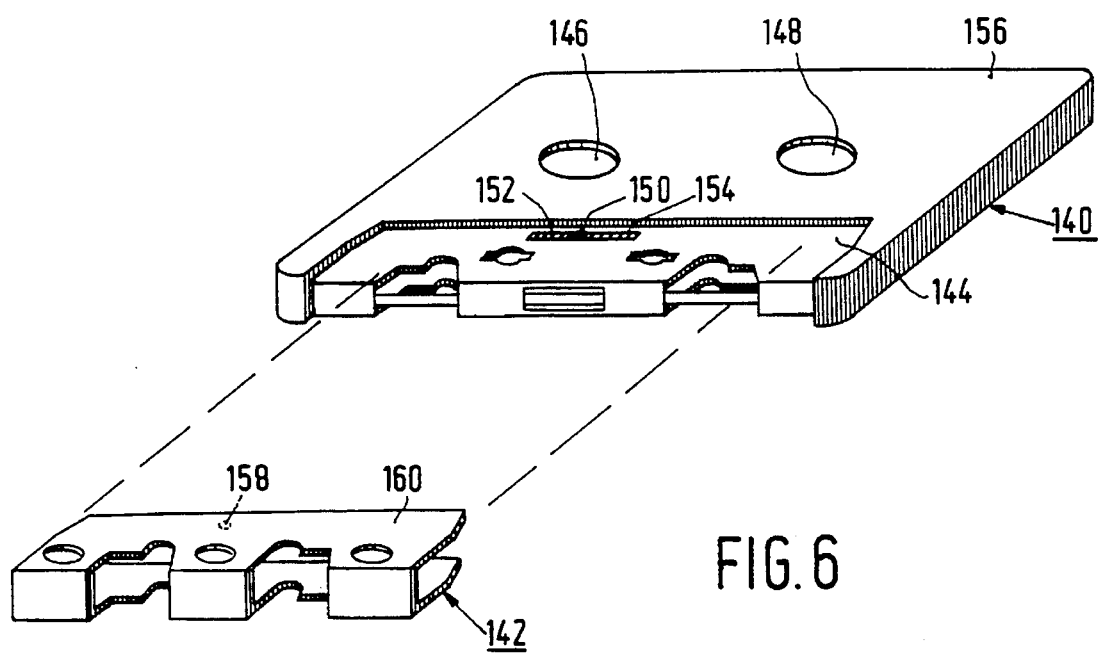
FIG. 6 is a perspective view of a second embodiment of a cassette in accordance with the invention with a detached shutter.

FIG. 6 shows another embodiment of a magnetic-tape cassette in accordance with the invention. The difference between the cassette 140 and the cassette 41 described above resides in the shape of the shutter 142 and, consequently, the shape of the recess 144 and of the urging means. In the cassette 140 the drive apertures 146 and 148 are not covered by the shutter 142. Consequently, the shutter 142 is smaller than the shutter 66 of the cassette 41. This construction requires a modification of the urging means. The urging means comprise a pin 150 connected to helical-spring means by two portions 152 and 154 arranged in a slot in a main wall 156 of the cassette 140. The pin 150 is situated in a potholder 158 formed in a main portion 160 of the shutter 142. The helical spring means may comprise two separate springs or may be constituted by a single spring.

Figure 7:
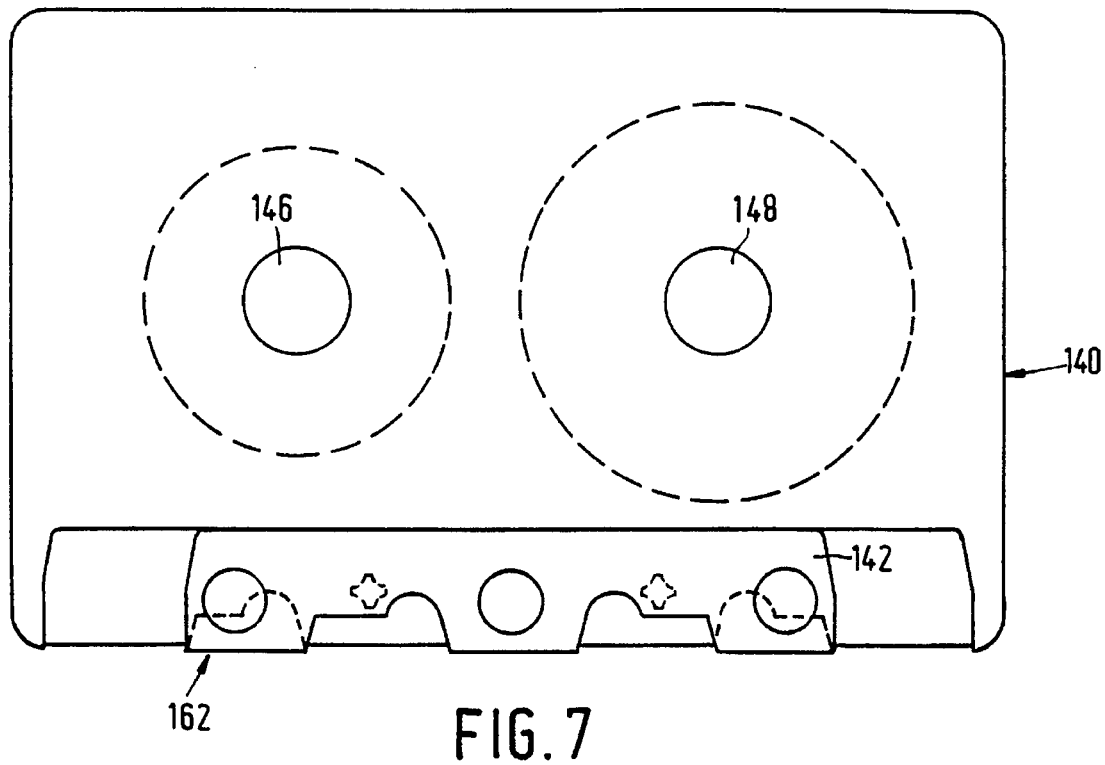
FIG. 7 is a plan view of a cassette shown in FIG. 6 with the shutter shown in the closed position.

FIG. 7 shows the shutter 142 in a closed center position 162 corresponding to the closed position. The drive apertures 146, 148 are not covered by the shutter 142.

Figure 8:
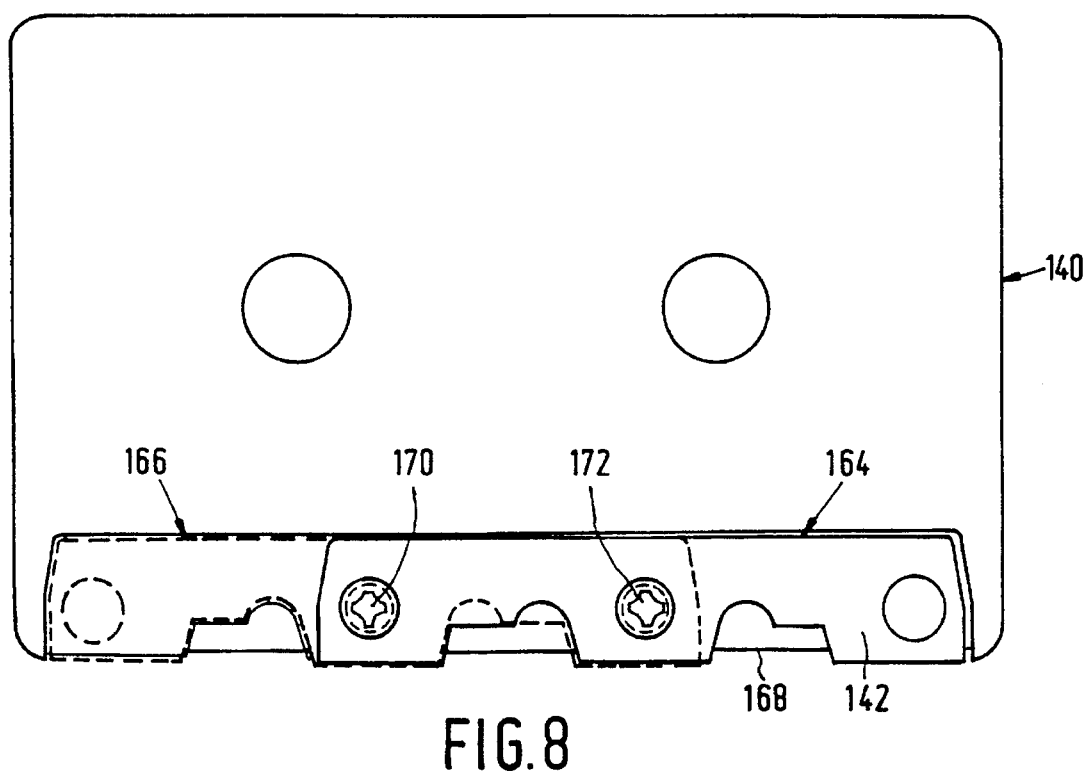
FIG. 8 is a plan view of the cassette shown in FIG. 6 with the shutter shown in an open position.

FIG. 8 shows the two open positions 164 and 166 of the shutter 142. The locating apertures 170 and 172 and the magnetic tape 168 are freely accessible in the open position.

Figure 9:
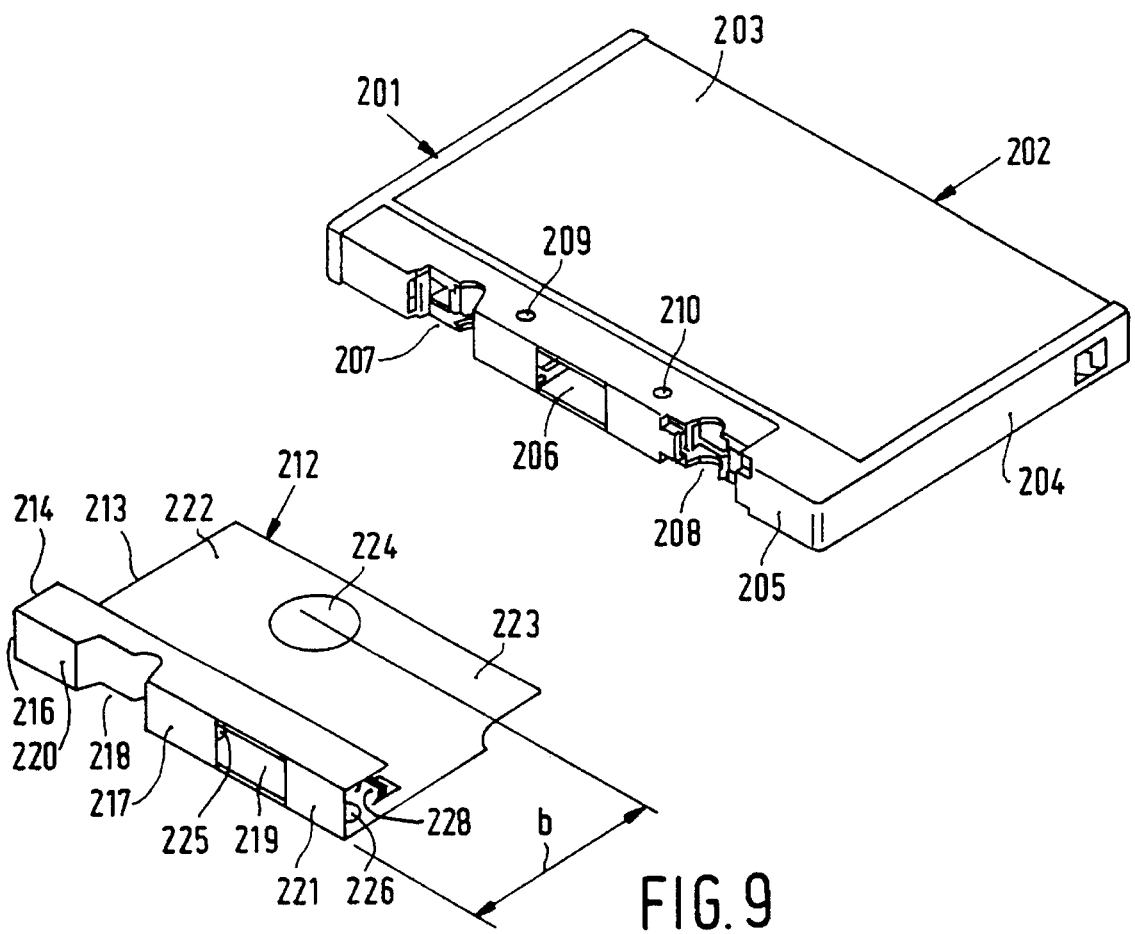
FIG. 9 is a perspective view of a third embodiment of a cassette in accordance with the invention with a detached shutter.

FIG. 9 shows a third embodiment of a cassette in accordance with the invention. The cassette 201 comprises a housing having two main walls 203 interconnected by transverse walls 204, of which one transverse wall constitutes a cassette front-wall 205. The cassette front wall 205 has a central opening 206 and at each side thereof a pressure-roller opening 207 and 208, respectively, which extends into the relevant main wall. The main walls 203 are formed with passages 209 and 210 for the passage of locating pins of an apparatus. If the cassette is situated in an apparatus, the capstans of the apparatus, in addition to the pressure rollers, engage in the pressure roller openings. The cassette further has a shutter 212 having main portions 213 and 214, which overlie the main walls 203 of the housing 202, and a shutter front wall 216 which extends along the cassette front wall 205. The shutter front wall 216 has a central front wall 217 and lateral front walls 220 and 221 at opposite sides of said central front wall and spaced therefrom by front openings 218 and 219. A main portion 213 of the shutter 212 has cover portions 222 and 223 for closing drive apertures in a main wall of the cassette in the closed position. The main portion 213 further has an aperture 224 to expose one of the drive apertures in the open position. To expose the locating apertures 209 and 210 passages 225 and 226 are formed in the main portion 213. The main portion 213 further comprises bent portions 228 which serve as guide elements for guiding the shutter during its displacement.

Figure 10:
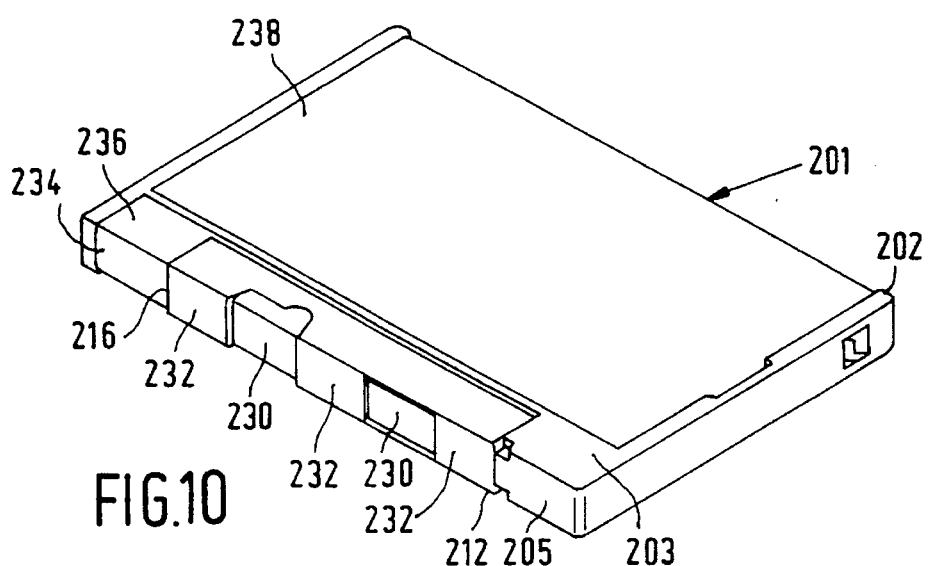
FIG. 10 is a perspective view of the cassette shown in FIG. 9 in the assembled condition.

FIG. 10 shows the cassette 201 described above in its assembled condition, the shutter 212 being shown in its closed position. In the closed position the front openings in the shutter face the imperforate portion 230 of the cassette front wall 205 and the imperforate portion 232 of the shutter front wall 216 faces the openings in the cassette front wall 205. The portions 234 and 236 of the cassette front wall 205 and of the main wall 203, respectively, are recessed. The shutter 212 is situated in these recesses so that the outer side of the shutter 212 is flush with the non-recessed portions of the housing 202. The main wall 203 further has a recess 238 for a label. It is desirable to make the dimensions of the label as long as possible. Therefore, the main portion 214 of the shutter 212 is made as small as possible. The main portion 214 does not extend beyond half the distance between the cassette front wall 205 and the centers of the reels, which distance is equal to the distance between the shutter front wall 216 and the center of the recess 224 in the main wall 213 of the shutter.

Figure 11:
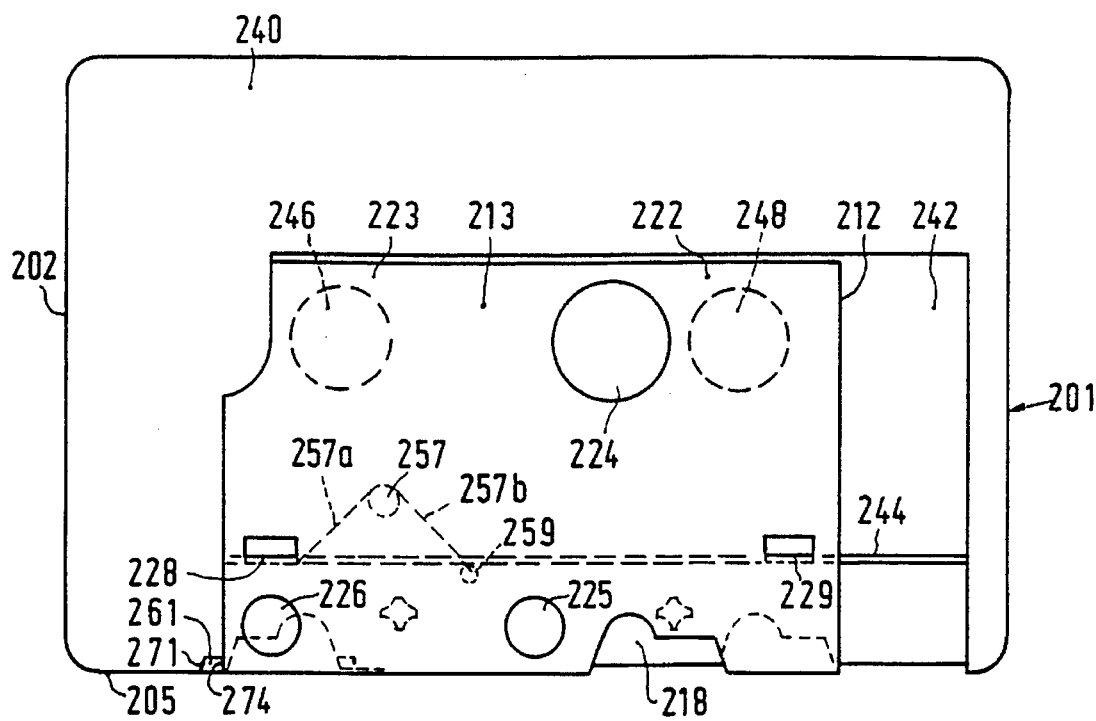
FIG. 11 is an underneath view of the cassette shown in FIG. 10 with a shutter shown in the closed position.
Figure 12:
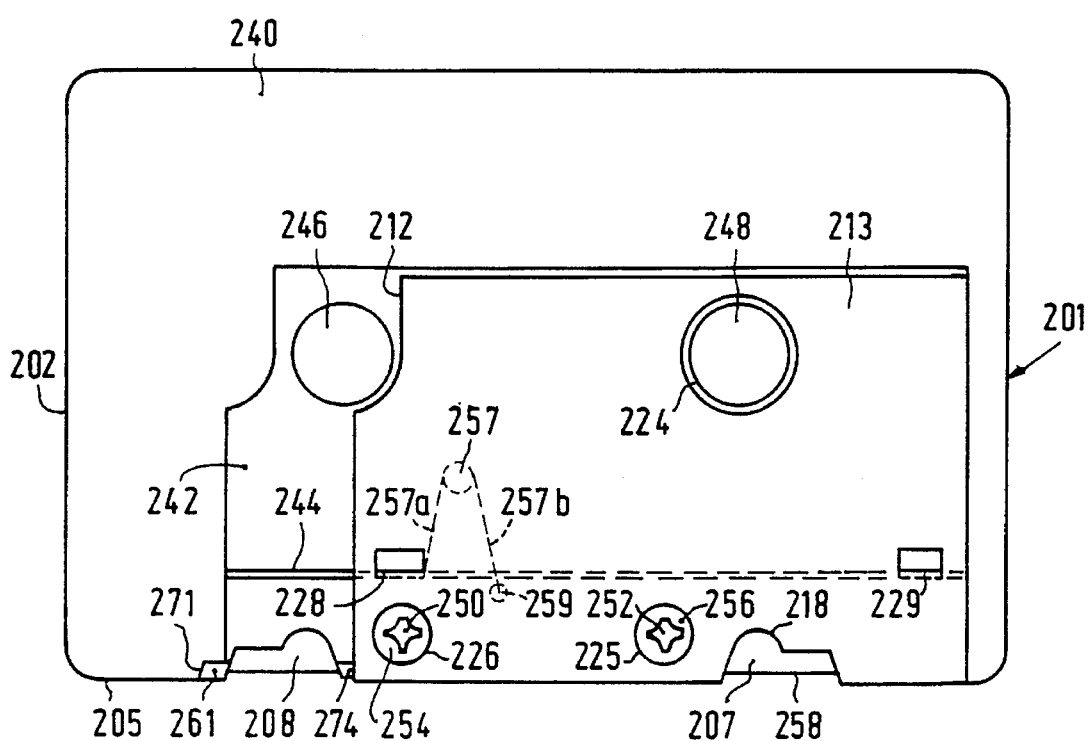
FIG. 12 is an underneath view of the cassette of FIG 10 with a shutter shown in the open position.

FIGS. 11 and 12 show the other main wall 240 of the cassette 201. FIG. 11 shows the shutter 212 in the closed position and FIG. 12 shows the shutter 212 in the open position. Again the main portion 213 of the shutter is situated in a recessed portion 242 of the main wall 240 of the housing 202. The guide portions 228 and 229 engage in a guide groove 244 in the main wall 240 of the cassette. In the closed position (FIG. 11), the drive apertures 246 and 248 are covered by the cover portions 222 and 223 and the aperture 224 as well as the passages 225 and 226. The front openings 218 and 219 face imperforate portions of the housing 202 of the cassette. In the open position (FIG. 12), the aperture 224 faces the drive aperture 248 and the other drive aperture 246 is situated beside the shutter 212. The passages 225 and 226 expose locating apertures 250 and 252 and also portions 254 and 256 of the main wall around the locating apertures, which portions 254 and 256 serve as supporting surfaces adapted to cooperate with supporting surfaces 13 and 14 of the locating pins 11 and 12 of the apparatus 1 (see FIG. 1). The front opening 218 in the shutter exposes the pressure roller opening 207 in the housing and the other pressure roller opening 208 is situated beside the shutter in the open position of this shutter, so that the magnetic tape 258 can cooperate with tape-transport means of an apparatus. In order to ensure that the shutter 212 has a stable closed position the cassette 201 comprises urging means 257 which urge the shutter 212 back from the open position (FIG. 12) into the closed position (FIG. 11). These urging means comprise resilient means in the form of a spring 257 having two springs legs 257a and 257b. One spring leg 257a acts against the guide portion 228 of the shutter and the other spring leg 257b extends through a hole 259 in the main wall 240 and is thereby immobilized relative to the housing 202.

Figure 13:
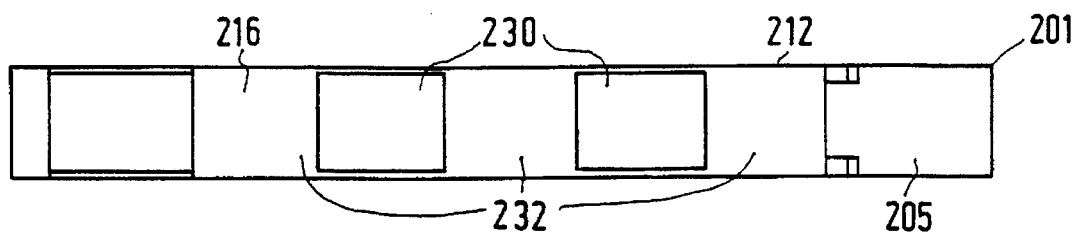
FIG. 13 is front view of the cassette shown in FIG. 10 with the shutter shown in the closed position.
Figure 14:
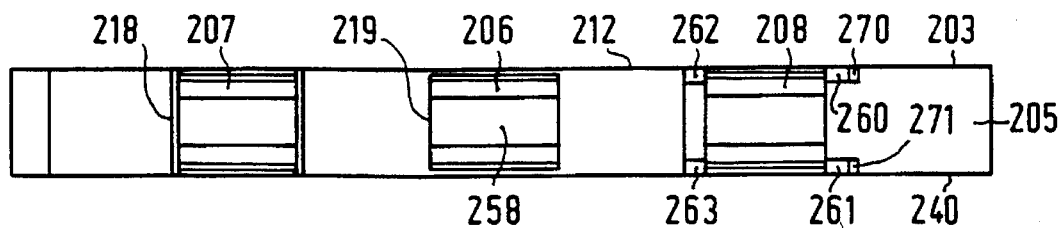
FIG. 14 is a front view of the cassette shown in FIG. 10 with a shutter shown in the open position.

FIGS. 13 and 14 show the front of the cassette 201 with the shutter 212 in the closed position and in the open position, respectively. In the closed position (FIG. 13), the imperforate portions 232 of the shutter front wall 216 faces the central opening 206 and the pressure roller openings 207 and 208 and the front openings 218 and 219 face the imperforate portion 230 of the cassette front wall 205. In the opened position (FIG. 14), the front openings 218 and 219 coincide with the central opening 206 and the pressure roller opening 207, while the other pressure roller opening 208 is situated beside the shutter 212 to give access to the magnetic tape 258.

Figure 15:
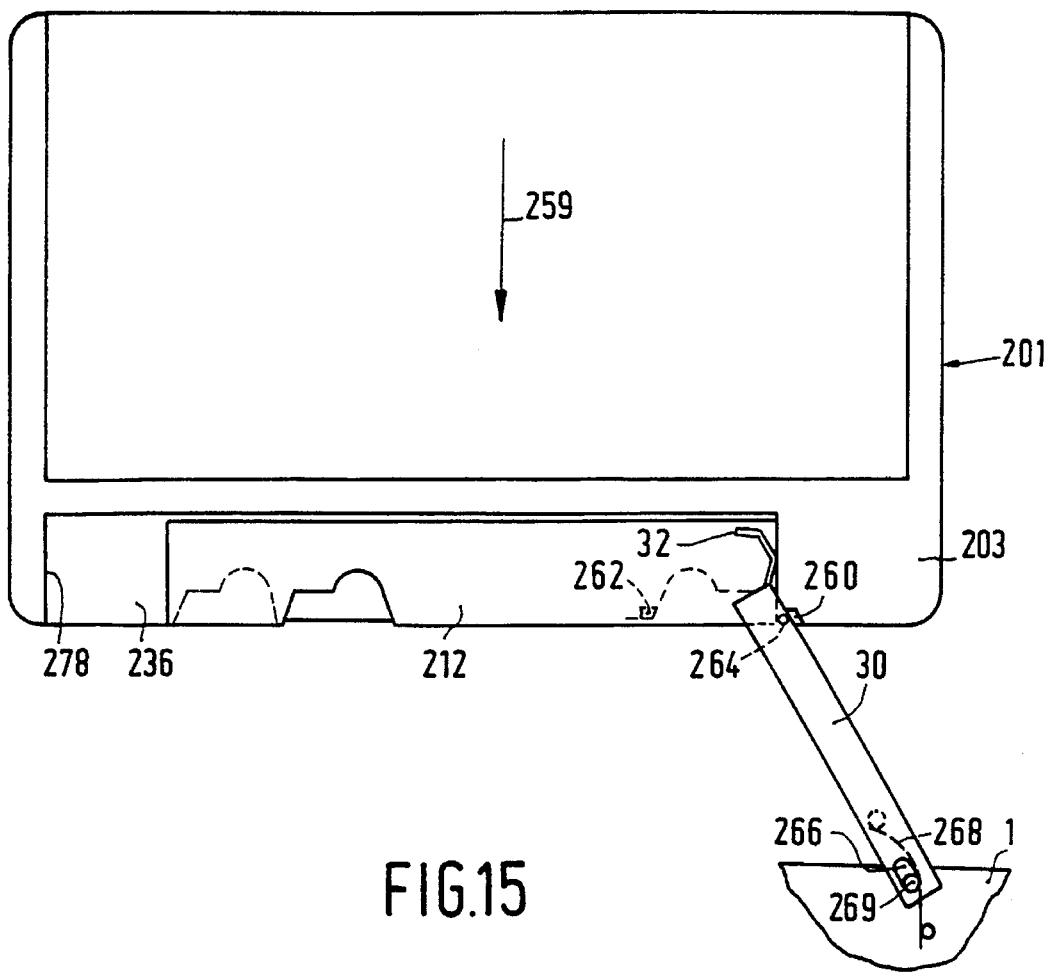
FIG. 15 is a plan view of the cassette shown in FIG. 10 with the shutter shown in the closed position and showing the urging means of a apparatus in accordance with the invention.
Figure 16:
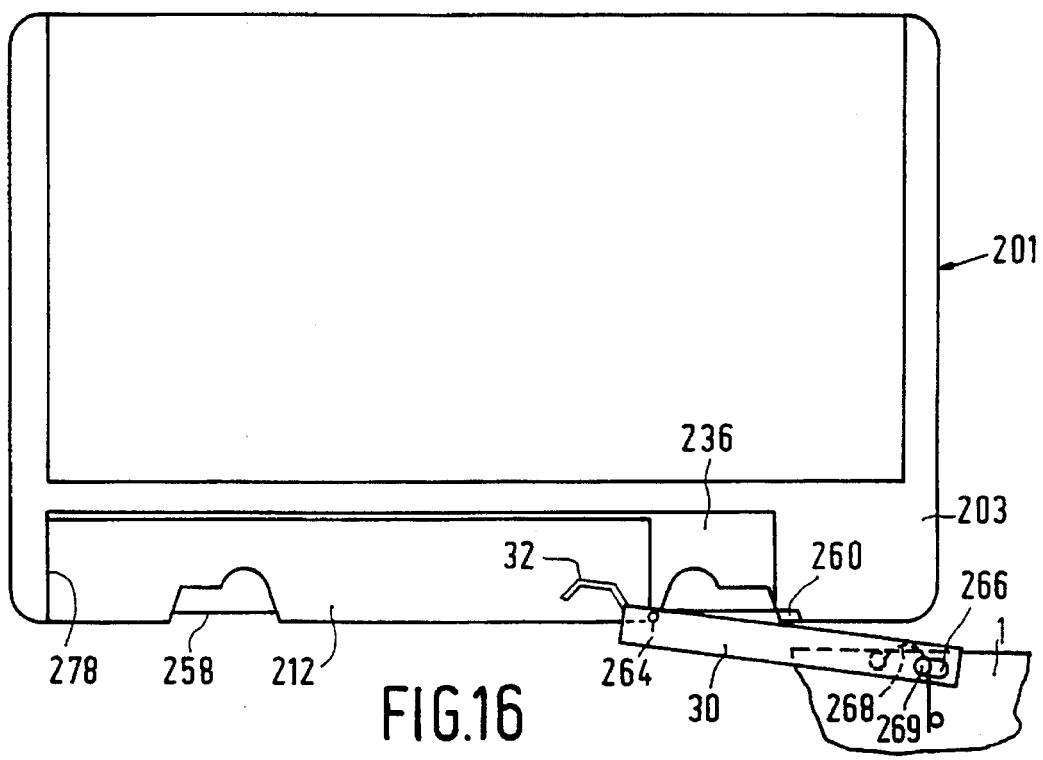
FIG. 16 is a plan view of the cassette shown in FIG. 10 with the shutter shown in the open position and showing the urging means of an apparatus.

The principle of opening the shutter 212 is illustrated in FIGS. 15 and 16. FIG. 15 illustrates the situation in which the cassette 201 has been inserted partly into the apparatus 1 in the direction indicated by the arrow 259. In the situation illustrated in FIG. 15 the cassette 201 has just come in contact with the urging means 30 and the shutter 212 is still in the closed position. FIG. 16 illustrates the situation in which the shutter 212 has been slid into its open position by the urging means 30.

Figure 17:
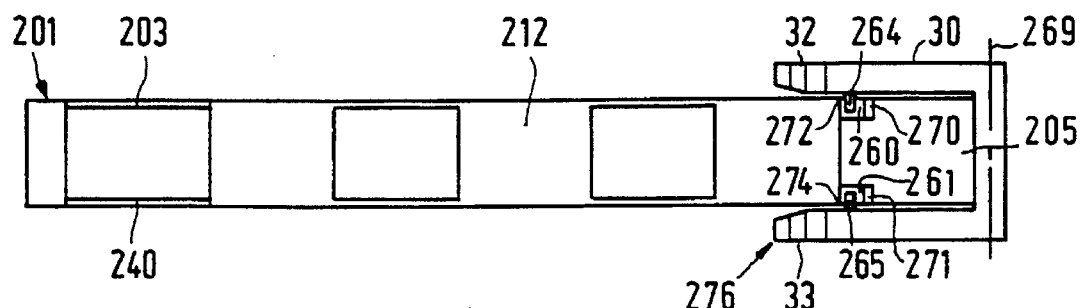
FIG. 17 is a front view of the cassette shown in FIG. 15 with urging means.

FIG. 17 is a front view of the cassette 201 and the urging means 30 in the situation in which the shutter 212 is still in its closed position. The urging means 30 have a forkshaped free end portions 276, which partly engages over the main walls of the cassette and which is situated at both sides of the cassette 201. In order to exert a lateral pressure on a lateral edge 272, 274 (see also FIGS. 11 and 12) of a main portion 213, 214 of the shutter 212, the urging means 30 comprises a portion 264, 265 which is in contact with the lateral edge 272, 274 of the shutter 212. This lateral pressure on the shutter 212 causes the shutter to be moved from the closed position (FIG. 15) to the opened position (FIG. 16). The urging means 30 comprises urging projections 264 and 265 which constitute the portion of the urging means 30 which is in contact with the lateral edge 272, 274 of the shutter 212. To receive the urging projections 264 and 265 the main walls 203 and 240 of the cassette are formed with recesses 260 and 261, which at the side which is remote from the shutter 212 each have a bevelled edge 270, 271 which is inclined relative to the cassette front wall 205.

During insertion of the cassette 201 the urging means 30 pivots about a pivotal axis 269 (see FIGS. 15 and 16). In order to ensure that in the opened position of the shutter the openings in the cassette are exposed appropriately, the urging means 30 urge the shutter against a bounding wall 278 of the recessed portion 236 of the main wall 203. This also precludes rattling of the shutter 212 in its open position. The required pressure is provided by a spring 268. In the open position of the shutter the urging means has moved towards the pivotal axis 269. This is possible because the urging means 30 is formed with a slot 266 at the location of the pivotal axis 269. This displacement causes the spring 268 to be tensioned and to exert a force on the shutter 212 by the urging means 30. The spring 268 also ensures that when the cassette is removed the urging means 30 resumes the position illustrated in FIG. 15.

Figure 18:
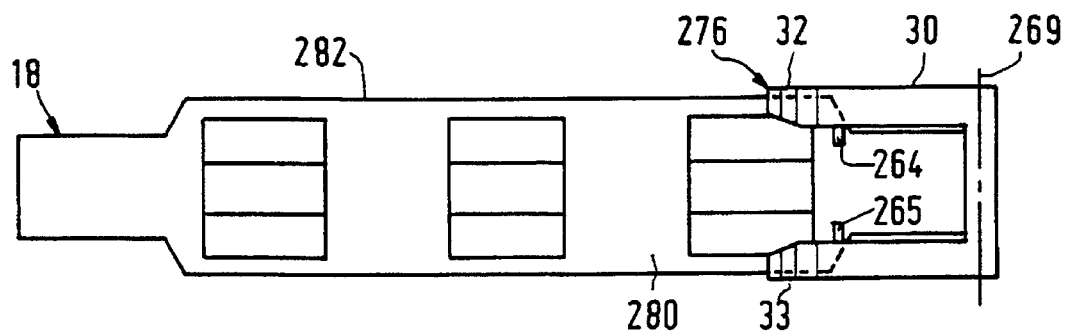
FIG. 18 is a front view similar to that in FIG. 17 but showing a cassette in accordance with the Compact Cassette system and urging means of an apparatus in accordance with the invention.

As already stated in the beginning, the apparatus in accordance with the invention can also cooperate with a Compact Cassette. Since a Compact Cassette does not comprise a shutter the actuating means 30 (which includes the urging means) need not be activated to open the shutter. In the apparatus in accordance with the invention this is achieved by pushing away the urging means 30, so that the urging projections 264 and 265 are not in contact with the Compact Cassette. For this purpose the urging means 30 comprise sensing means 32 and 33. FIG. 18 is a front view of the Compact Cassette 18 and the urging means 30. The fork-shaped free end portion 276 of the urging means 30 now cannot engage around the cassette. The sensing means 32 and 33, situated at the location of the fork-shaped free end portion 276, are now in contact with a front side 280 of the cassette 18 at the location of the thicker portion 282. Thus, the urging means 30 are pushed away when the cassette 18 is inserted.

It is to be noted that the invention is not limited to the embodiments of the cassette shown herein but that numerous other embodiments are possible within the scope of the appended Claims. For example, a variety of other constructions of the urging means are possible, for example comprising rubber means. The urging means may be dispensed with and the shutter can be retained by means of projections on the main walls of the cassettes or by friction between the shutter and the main wall, so that some effort must be applied to move the shutter. The shutter may also be used in conjunction with non-flat cassettes, for example the standard Compact Cassettes which have a thicker portion at the location of the openings in the front wall.

Moreover, the tape transport need not be effected by means of capstans and pressure rollers, the tape transport speed being controlled by controlling the reel drive spindles. In that case the tape transport speed can be derived from the signals originating from the magnetic head means. In that case the cassette front wall need be provided with only one central opening and the shutter front wall need comprise only one central front wall. An intermediate form may be to provide only one capstan-pressure roller combination for tape transport in both directions, which combination operates normally in the case of tape transport in one direction to provide tape traction and which in the other direction of tape transport, in which the tape is driven by a reel drive spindle, controls the tape speed by holding back the tape. In this case the cassette front wall needs to have only one pressure-roller opening in addition to the central opening, and only one front opening needs to be provided in the shutter front wall.

I claim:

1. A magnetic-tape apparatus comprising a capstan-pressure-roller combination, two reel drive spindles and a magnetic head for recording and/or reproducing information on a magnetic tape present in a cassette of a first type having two plane parallel main walls interconnected by transverse walls, of which one transverse wall constitutes a cassette front wall having openings for the passage of the magnetic head and the pressure-roller, which cassette further comprises a shutter which is slidable along the cassette front wall in a lateral direction between a closed position in which the openings in the cassette front wall are covered by the shutter and an open position in which the openings are exposed by the shutter, which shutter has a shutter front wall situated near the cassette front wall and extending parallel thereto and which shutter further comprises main portions adjoining the shutter front wall and overlying the main walls of the cassette, which apparatus further comprises actuating means for opening the shutter of the cassette, said actuating means comprising urging means for exerting lateral pressure on the shutter of the cassette to move the shutter laterally along the cassette from the closed position to the open position, characterized in that:

the apparatus further comprises means for cooperating with cassettes of a second type not having a shutter and having a cassette front wall of larger height than the cassettes of the first type with a shutter and in that the actuating means comprise sensing means for sensing the height of the cassette front wall and for moving the actuating means to a position in which cassettes of the second type, having a cassette front wall of larger height than the cassettes of the first type, can be inserted into the apparatus and cooperate freely with said capstan-pressure roller combination, said reel-drive spindles, and said magnetic head.

2. An apparatus as claimed in claim 1, characterized in that the urging means comprises a free end portion with opposing tines which engages around the cassette front wall of the cassette of the first type having a shutter and urging projections for engaging and sliding the shutter from the closed position to the open position.

3. An apparatus as claimed in claim 2, characterized in that said urging means is pivotable about a pivotal axis and includes a slot at the location of the pivotal axis so that the urging projections are translatable in a direction towards the pivotal axis.

4. An apparatus as claimed in claim 1, characterized in that said urging means is pivotable about a pivotal axis and includes a slot at the location of the pivotal axis so that the urging means are translatable in a direction towards the pivotal axis.

5. A magnetic tape cassette apparatus for cooperating with a first and a second, different type of magnetic tape cassettes, each type of cassette having a housing with a front wall with a magnetic head access opening, a tape reel, and a length of magnetic tape on the tape reel transportable past the head access opening, the first type including a sliding cover slidable on the housing between a closed and an open position to cover and uncover, respectively, the head access opening, and the second type having a portion of the front wall which has a greater height than a corresponding portion of the front wall of the first type of cassette, wherein said magnetic tape apparatus comprises:

a. a cassette holder for receiving the magnetic tape cassettes;

b. a reel drive spindle for driving the tape reel of the cassettes;

c. magnetic head means for communicating with the magnetic tape;

d. means for transporting the magnetic tape past said head means;

e. shutter opening means for opening the shutter of the first type of cassette; and f. means engageable with the portion of greater height of the cassettes of the second type for displacing said shutter opening means to permit insertion of the cassettes of the second type.

6. A magnetic type cassette apparatus according to claim 5, wherein the cassette of the first type includes a stop portion engaged by said shutter in the open position of the shutter, and said shutter opening means including biasing means for biasing the cassette shutter in its open position against the stop portion of the housing.

7. A magnetic tape cassette according to claim 6, wherein the shutter opening means includes an arm having a longitudinal axis and pivotable about a pivot, said arm being translatable along its longitudinal axis relative to said pivot.

8. A magnetic tape cassette apparatus according to claim 6, wherein said biasing means biases said pivotable arm in the longitudinal direction of said arm relative to said pivot in the direction of the stop portion of the cassette housing.

9. A magnetic tape cassette apparatus according to claim 8, wherein:

the cassette of the first type is insertable into said cassette holder in a cassette insertion direction with the shutter translatable between the open and closed positions in a direction generally normal to said cassette insertion direction; and during insertion of said cassette of the first type into said holder, said pivotable arm has an end portion which engages said shutter in the closed position of the shutter, pivots about said pivot with said end portion travelling in the direction of insertion and normal to the direction of insertion for translating the shutter from the closed position to the open position, and as the shutter nears the open position said arm translates along the longitudinal direction thereof relative to said pivot away from the stop portion thereof for loading said biasing means and biasing the shutter against the stop portion of the cassette.

* * * * *